United States Patent [19]

Takahashi et al.

[11] Patent Number: 5,310,872
[45] Date of Patent: May 10, 1994

[54] POLYESTER TYING TAPE-LIKE MATERIALS

[75] Inventors: Takeshi Takahashi; Ryosuke Kamei; Shigenori Terazono; Tetuya Takahashi; Akira Nakamura, all of Kawasaki; Eiichiro Takiyama, Kamakura, all of Japan

[73] Assignee: Showa Highpolymer Co., Ltd., Tokyo, Japan

[21] Appl. No.: 49,436

[22] Filed: Apr. 20, 1993

[30] Foreign Application Priority Data

May 8, 1992 [JP] Japan .................. 4-116241
May 12, 1992 [JP] Japan .................. 4-119195
May 12, 1992 [JP] Japan .................. 4-119198

[51] Int. Cl.$^5$ ............................. C08G 18/34
[52] U.S. Cl. ...................... 525/440; 528/80; 528/81; 528/83
[58] Field of Search .............. 525/440; 528/80, 81, 528/83

[56] References Cited

U.S. PATENT DOCUMENTS

| | | | |
|---|---|---|---|
| 2,999,851 | 9/1961 | Elmer | 528/83 |
| 4,057,537 | 11/1977 | Sinclair | 528/67 |
| 4,166,873 | 9/1979 | Gilliam | 528/83 |

FOREIGN PATENT DOCUMENTS

| | | |
|---|---|---|
| 0323700 | 7/1989 | European Pat. Off. |
| 0393819 | 10/1990 | European Pat. Off. |
| 0448294 | 9/1991 | European Pat. Off. |
| 1059075 | 3/1954 | France. |
| 748872 | 5/1956 | United Kingdom. |

OTHER PUBLICATIONS

Database WPI, Week 8911, Derwent Publications Ltd., London, GB, AN 89-081171 for JP-A-1-33201 (Dainippon Ink), Feb. 3, 1989.

*Primary Examiner*—Maurice J. Welsh
*Attorney, Agent, or Firm*—Sughrue, Mion, Zinn, Macpeak & Seas

[57] ABSTRACT

Tying tape-like materials formed by extrusion molding, comprising as a main component an aliphatic polyester having a melt viscosity of $1.0 \times 10^3$–$4.0 \times 10^4$ poises at a temperature of 190° C. and a shear rate of 100 sec$^{-1}$, and having a melting point of 70°–190° C. The present invention provides tying tape-like materials excellent in heat stability, mechanical strength and packing property as well as having biodegradability which can be used as packing materials.

14 Claims, No Drawings

POLYESTER TYING TAPE-LIKE MATERIALS

BACKGROUND OF THE INVENTION

1. Field of the Invention

The present invention relates to tying tape-like materials having excellent heat stability and mechanical strength which are prepared by using aliphatic polyesters with biodegradability and sufficiently high molecular weights and specific melt properties for practical use. Particularly, the present invention relates to packing and tying band or flat tape, and ribbed tape prepared by using aliphatic polyesters having a sufficiently high molecular weight and having the above properties.

2. Discussion of the Background

In recent years, with the progress of the distribution system and the agriculture plastics have increasingly been used for containers, bags, packing materials and the like which are used for distribution and agricultural work. On the other hand, large amounts of plastics waste from such materials have the possibility of polluting rivers, oceans, soil and are becoming a great social problem. To prevent such pollution the development of biodegradable plastics has been desired; for example, poly(3-hydroxybutylate) produced by fermentation methods using microorganisms, blends of general-purpose plastics and starch, a naturally occurring polymer, and the like are already known. The former polymer has a drawback in that it is poor in molding properties because the polymer has a heat decomposition temperature close to its melting point and a raw material efficiency is very bad because it is produced by microorganisms. On the other hand, since the naturally occurring polymer of the latter does not by itself have thermoplasticity, the polymer has defects in molding properties, and is greatly limited in its range of application.

On the other hand, although it is known that aliphatic polyesters are biodegradable, they have hardly been used because polymeric material sufficient enough to obtain practical molded product cannot be obtained. Recently, it has been found that a ring-opening polymerization of ε-caprolactone produces a higher molecular weight polymer, and proposed to use the polymer as a biodegradable resin. However, the resulting polymer is limited to only special applications because of a low melting point of 62° C. and a high cost thereof. Further, although glycolic acid, lactic acid and the like are polymerized by a ring-opening polymerization of glycolide and lactide thereof to obtain polymers with higher molecular weights so as to be sometimes used as medical fibers and the like, the polymers are not used in great amounts as industrial parts, automotive members, domestic articles and the like because their decomposition temperatures are close to their melting point and they have defects in their molding properties.

Tying materials, for example, extruded bands, flat tapes, ribbed tapes and the like (herein after referred to as "tape-like materials" generically) as one of packaging materials and agricultural materials required to have corrosion resistance, high strength and the like mainly consist of a high density polyethylene resin and polypropylene resin from among the polyolefins. The band is used for packaging heavy materials and the tying tape is often applied to strings for binding packages, binder tapes for automatic tying machines. Since polyethylene terephthalate, polypropylene terephthalate and the like are used for high strength tape in specified applications, it goes without saying that polymeric polyesters (referring to polymeric polyesters having number-average molecular weights of at least 10,000) generally used for the plastics are limited to polyethylene terephthalete, a condensate of terephthalic acid (including dimethyl terephthalate) and ethylene glycol. Although there are cases of 2,6-naphthalenedicarboxylic acid being used instead of terephthalic acid, there are no reports of trials which resulted in providing the obtained polymers with biodegradability.

Therefore, it is safe to say that there has been no concept of trying to make the molding of tying tape-like materials using biodegradable aliphatic polyesters in which aliphatic dicarboxylic acid was used practical.

One of the reasons why this application concept has not been thought of is felt to be that in spite of the required special molding conditions and physical properties for the above tying tape-like materials, most of the above-mentioned aliphatic polyesters have melting points of 100° C. or lower even if they are crystalline, and have poor heat stability when melted above that. Of further importance is that the properties, particularly mechanical properties such as tensile strength, of these aliphatic polyesters show markedly poor values even when they are the same level of number-average molecular weight as the above-mentioned polyethylene terephthalate, so just conceiving that the molded articles having required strength and the like would be obtained was difficult.

Another reason seems to be that studies for improving the physical properties of the aliphatic polyesters by increasing their number-average molecular weights were not make sufficiently advanced because of their poor heat stability.

The object of the present invention is to provide tying tape-like materials prepared by using the above-mentioned aliphatic polyesters as their components which have sufficient high molecular weights for practical use, have excellent mechanical properties represented by heat stability and tensile strength, and which may be decomposed by microorganisms and the like, i.e., are biodegradable as one means of waste disposal so that they may be easily disposed of after the use thereof.

SUMMARY OF THE INVENTION

As a result of various studies of the reaction conditions for obtaining polyesters having sufficient high molecular weight for practical use and molding properties suitable for tying tape-like materials, the present inventors have obtained specific aliphatic polyesters that maintain biodegradability while having sufficient high molecular weights for practical use, then have found that tying tape-like materials prepared from the polyesters have heat stability and mechanical strength as well as the above-mentioned biodegradability to achieve the present invention.

That is, the present invention provides: (A) tying tape-like materials formed by extrusion molding mainly consisting of an aliphatic polyester having a melt viscosity of $1.0 \times 10^3$–$4.0 \times 10^4$ poises at a temperature of 190° C. and a shear rate of 100 sec$^{-1}$, and having a melt temperature of 70°–190° C.; (B) tying tape-like materials according to (A) in which the number-average molecular weight of the aliphatic polyester is at least 10,000 and includes 0.03–3% by weight urethane bonds; (C) tying tape-like materials according to (A) or (B) essentially consisting of an aliphatic polyester obtained by reacting 0.1–5 parts by weight of diisocyanate with 100 parts by weight of an aliphatic polyester prepolymer having a number-average molecular weight of at least 5,000 and a melt temperature of at least 60° C.

DETAILED DESCRIPTION OF THE INVENTION

The present invention will be described below in further detail.

The aliphatic polyester of the present invention mainly consists of a polyester obtained by reacting two components of glycols and dicarboxylic acid (or acid anhydrides thereof), and if necessary as a third component, with at least one polyfunctional component selected from the group consisting of trifunctional or tetrafunctional polyols, oxycarboxylic acids, and polybasic carboxylic acids (or acid anhydrides thereof). The aliphatic polyesters are prepared by reacting relatively high molecular weight polyester prepolymers which have hydroxyl groups at ends with a coupling agent so as to make them even higher molecular weight polymer.

It has been known to obtain polyurethane by reacting a low molecular weight polyester prepolymer having a number-average molecular weight of 2,000-2,500, which have hydroxyl groups as the terminal groups, with diisocyanate as a coupling agent in the preparation of rubbers, foams, coatings and adhesives.

However, the polyester prepolymers used in these polyurethane foams, coatings and adhesives are prepolymers having a low molecular weight and a number-average molecular weight of 2,000-2,500 which is the maximum that can be prepared by non-catalytic reaction. To obtain practical physical properties as the polyurethane, it is necessary that the content of diisocyanate should be as much as 10-20 parts by weight in relation to 100 parts by weight of this low molecular weight prepolymer. When such a large amount of diisocyanate is added to the low molecular weight polyester melted at 150° C. or higher, gelation occurs so that no normal resins which can be molded in the form of a melt can be obtained.

Therefore, polyesters which are obtained by the reaction of a large amount of diisocyanate as a raw material for such a low molecular weight polyester prepolymers cannot be used as the raw material for the tying tape-like materials of the present invention.

Also, as shown in the case of polyurethane rubbers, although a method is coceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relatively high molecular weight polyester prepolymer is to be used, heavy metal catalysts required to prepare the prepolymer would promote the reactivity of the above-mentioned isocyanate groups to undesirably cause poor preservativity, generation of crosslinking and branching; hence a number-average molecular weight of not more than around 2,500 of polyester prepolymers would be the limit if they were to be prepared without catalysts.

The polyester prepolymers to obtain the aliphatic polyesters used in the present invention are relatively high molecular weight saturated aliphaticha polyesters having substantially hydroxyl groups at the ends thereof, number-average molecular weights of at least 5,000, preferably at least 10,000, and melting point of 60° C. or higher, which are obtained by reacting glycols and dibasic carboxylic acids (or acid anhydrides thereof) in the presence of catalysts. When a prepolymer having a number-average molecular weight of lower than 5,000 is used, the small amounts of 0.1-5 parts by weight of coupling agents used in the present invention cannot provide tying tape-like materials polyesters having good physical properties. When a polyester prepolymer having a number-average molecular weight of 5,000 or higher is used, with a hydroxyl valence of 30 or less, the use of small amounts of coupling agents even under severe conditions such as a molten state and the like can produce polymeric polyesters, without gelation.

That is, the polymer of which the tying tape-like materials of the present invention are composed has a repeated chain structure in which a polyester prepolymer consisting of an aliphatic glycol and aliphatic dicarboxylic acid, which has a number-average molecular weight of 5,000 or more, preferably 10,000 or more is combined through the urethane bond derived from, for example, diisocyanate as a coupling agent.

Further, the polymer of which the tying tape-like materials of the present invention are composed has a repeated chain structure in which the above-mentioned polyester prepolymer with branched long chains is combined through the urethane bonds derived from, for example, diisocyanate as a coupling agent. When oxazoline, epoxy compounds, and acid anhydrides are used as a coupling agent, the polyester prepolymer has a chain structure through the ester bond.

The tying tape-like materials of the present invention consisting of an aliphatic polyester having a melt viscosity of $1.0 \times 10^3 - 4.0 \times 10^4$ poises at a temperature of 190° C. at a shear rate of 100 sec$^{-1}$ and a melting point of 70°-190° C., particularly the tying tape-like materials of the present invention which essentially consists of an aliphatic polyester obtained by reacting 0.1-5 parts by weight of diisocyanate with 100 parts by weight of an aliphatic polyester prepolymer having a number-average molecular weight of 5,000 or higher and a melting point of 60° C. or higher has biodegradability when buried in the earth; generates lower heat of combustion even when thermally disposed of than polyethylene and polypropyrene; and has excellent in heat stability, thermal adhesion strength, unpacking property, mechanical strength (splitting resistance and the like) and flexibility. The band is thus useful as a packing band for conveyance.

Examples of glycols which can be used as a reaction component include aliphatic glycols. Among them those having a straight chain alkylene group with even number carbon atoms of 2, 4, 6, 8 and 10 such as: ethylene glycol, 1,4-butanediol, 1,6-hexanediol, 1,8-octanediol, 1,10-decanediol, and mixtures thereof are preferable.

Of these glycols, those having a smaller number of carbon atoms, such as ethylene glycol, 1,4-butanediol and 1,6-hexanediol, are preferable because they can produce an aliphatic polyester having a high crystalinity and a high melting point. In particular, ethylene glycol and 1,4-butanediol are most suitable because they produce good results.

Examples of aliphatic dicarboxylic acids or anhydrides thereof which provide aliphatic polyester by reacting with glycols include aliphatic dicarboxylic acids. Among them those having a straight chain alkylene group with even number carbon atoms of 2, 4, 6, 8 and 10 such as: succinic acid, adipic acid, suberic acid, sebacic acid, 1,10-decanedicarboxylic acid, succinic anhydride and mixtures thereof are preferable. Of these dicarboxylic acids, those having a smaller number of carbon atoms, such as succinic acid, adipic acid and succinic anhydride, are preferable because they can produce an aliphatic polyester having high crystallinity and high melting points. In particular, succinic acid, succinic anhydride and an acid mixture of succinic acid or succinic anhydride and another dicarboxylic acid such as adipic acid, suberic acid, sebacic acid or 1,10-decandicarboxylyc acid are preferable.

In the system of an acid mixture containing two or more acid components, for example, succinic acid and other dicarboxylic acids, the mixing ratio of succinic acid is at least 70 mol %, preferably at least 90 mol %, and the mixing ratio of the other carboxylic acids is 30 mol % or less, preferably 10 mol % or less.

A combination of 1,4-butanediol and succinic acid or succinic anhydride and a combination of ethylene glycol and succinic acid or succinic anhydride are particularly preferable for the present invention because the combinations exhibit melting points close to that of polyethylene. (Third component)

To these glycols and dicarboxylic acid, if necessary, may be added as a third component at least one polyfunctional component selected from the group consisting of trifunctional or tetrafunctional polyols, oxycarboxylic acid, and polybasic carboxylic acids (or acid anhydrides thereof). The addition of this third component, which causes the branching of long chains, can impart desirable properties in molten state to the polyester prepolymer, because the ratio of weight-average molecular weight (MW)/number-average molecular weight (Mn), i.e., the molecular weight distribution, increases with increases in its molecular weight.

In terms of the amount of polyfunctional components to be added without fear of gelation, a trifunctional component of 0.1–5 mole %, or a tetrafunctional component of 0.1–3 mole % is added relative to 100 mole % of the total of aliphatic dicarboxylic acid (or acid anhydride thereof) components.

Polyfunctional Components

Examples of polyfunctional components as the third component include trifunctional or tetrafunctional polyols, oxycarboxylic acids, and polybasic-carboxylic acids.

The trifunctional polyols representatively include trimethylol propane, glycerin or anhydrides thereof. The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient to the purposes of the present invention in view of commercial availability at low cost.

The tetrafunctional oxycarboxylic acid components are the following three types of components:

(i) A component which has three carboxyl groups and one hydroxyl group in one molecule;

(ii) Another component which has two carboxyl groups and two hydroxyl group in one molecule; and (iii) The remaining component which has three hydroxyl groups and one carboxyl group in one molecule. Any type can be used, though in view of commercial availability at low cost, citric acid and tartaric acid are practical and sufficient to the purposes of the present invention.

As a trifunctional polybasic carboxylic acid (or acid anhydride thereof) component trimesic acid, propane tricarboxylic acid and the like can be used. Among them, trimesic anhydride is practical for the purposes of the present invention.

As a tetrafunctional polybasic carboxylic acid (or anhydride thereof) various types of aliphatic compounds, cycloaliphatic compounds, aromatic compounds and the like, described in certain literatures, can be used. In view of commercial availability, for example, pyromellitic anhydride, benzophenone tetracarboxylic anhydride and cyclopentane tetracarboxylic anhydride are practical and sufficient to the purposes of the present invention.

These glycols and dibasic acids are mainly consisted of aliphatic series, while small amounts of other components, for example, aromatic series may be concomitantly used. These other components may be blended or copolymerized in amounts up to 20% by weight, preferably up to 10% by weight, and more preferably up to 5% by weight because using these compounds degrades biodegradability.

The polyester prepolymer for aliphatic polyesters to be used in the present invention has hydroxyl groups at the terminals. To introduce the hydroxyl groups, it is necessary that glycols are used somewhat excessively.

For preparation of the polyester prepolymer having a relatively high molecular weight, it is necessary to use deglycol-reaction catalysts in the deglycol reaction subsequent to the esterification.

Examples of the deglycol-reaction catalysts include titanium compounds such as acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001–1 part by weight, and preferably 0.01–0.1 part by weight relative to 100 parts by weight of the polyester prepolymer. These titanium compounds may be blended before the esterification, or may be blended immediately before the deglycol-reaction.

To the polyester prepolymer which has a number average molecular weight of at least 5,000, preferably at least 10,000, and whose terminal groups are substantially hydroxyl groups are added coupling agents in order to increase its number-average molecular weight.

Examples of the coupling agents include diisocyanate, oxazoline, diepoxy compounds, acid anhydrides and the like. Diisocyanate is particularly preferred.

In the cases of oxazoline and diepoxy compounds, it is necessary that the terminal hydroxyl groups are reacted with acid anhydrides and the like to convert them into carboxyl groups, then coupling agents are used.

Although not limited, examples of diisocyanate include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of hue of prepared resins, reactivity at the time of blending polyesters, and the like.

The adding amounts of these coupling agents are 0.1–5 parts by weight, and preferably 0.5–3 parts by weight relative to 100 parts by weight of polyester prepolymer. Addition of less than 0.1 part by weight causes insufficient coupling reaction, whereas with more than 5 parts by weight gelation tends to occur.

The addition is preferably performed when the polyester is in a uniformly melted state under easily stirrable conditions. Although it is not impossible for the coupling agents to be added to the polyester prepolymer in the solid state and melted and mixed through an extruder, adding the agents in a polyester preparation unit, or adding them to polyester prepolymer in a melt state (for example, in a kneader) is more practical.

When urethane bonds are contained in the aliphatic polyester to be used in the present invention, the amount of urethane bonds is 0.03–3.0% by weight, preferably 0.05–2.0% by weight, and more preferably 0.1–1.0% by weight.

The amount of urethane bonds is measured by $^{13}$C NMR, showing good correlation with the charge amount.

Less than 0.03% by weight of urethane bonds has a little effect on polymerization and leads to poor molding properties, whereas more than 3% by weight causes gelation.

The aliphatic polyester to be used in the present invention is required to have selected melt properties for tying tape formed by extrusion molding. That is, the aliphatic polyester to be used in the present invention needs to have a melt viscosity of $1.0 \times 10^3$–$4.0 \times 10^4$ poises, preferably $3.0 \times 10^3$–$3.0 \times 10^4$ poises at a temperature of 190° C. at a shear rate of 100 sec$^{-1}$.

With less than $1.0 \times 10^3$ poises, a tape like product swings greatly during melt extrusion, and thus stable tape width and satisfactory physical properties cannot be obtained. With more than $4.0 \times 10^4$ poises, melt fracture occurs, the tape texture detriorates.

The melt viscosity at a shear rate of 100 sec$^{-1}$ was calculated from a graph which shows the relation between the apparent viscosities and shear rates measured using a nozzle having a diameter of 1.0 mm and L/D of 10 at a resin temperature of 190° C.

The melting point of the aliphatic polyester to be used in the present invention needs to be 70°–190° C. preferably 70°–150° C., and more preferably 80°–135° C. A melting point of less than 70° C. will give the tape poor heat resistance to distort them, whereas more than 190° C. make it difficult to prepare them.

To achieve a melting point of more than 70° C. polyester prepolymer need to have a melting point of at least 60° C.

It is needless to say that when the above-mentioned aliphatic polyester is used to obtain the tying tape-like materials according to the present invention, if necessary, lubricants, waxes, coloring agents crystallizing promoters and reinforcing fibers as well as antioxidants, thermal stabilizers, UV absorbers and the like can be used concomitantly.

That is, antioxidants include hindered phenol antioxidants such as p-tert-butyl hydroxytoluene and p-tert-butyl hydroxyanisole, sulfur antioxidants such as distearyl thiodipropionate and dilauryl thiodipropionate, and the like; heat stabilizers include triphenyl phosphite, trilauryl phosphite, tris-nonylphenyl phosphite and the like; UV absorbers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmitate and the like; antistatic agents include N,N-bis(hydroxyethyl) alkyl amine, alkyl amine, alkyl allyl sulfonate, alkyl sulfonate and the like; flame retarders include hexabromocyclododecane, trim-(2,3-dichloropropyl) phosphate, pentabromophenyl allyl ether and the like; inorganic fillers include calcium carbonate, silica, titanium oxide, talc, mica, barium sulfate, alumina and the like; crystallizing promoters include polyethylene terephthalate, poly-transcyclohexane dimethanol terephthalate and the like; reinforcing fibers include inorganic fibers such as glass fiber, carbon fiber, boron fiber, silicon carbide fiber, graphite fiber, alumina fiber and amorphous fiber, and organic fibers such as aramide fiber, and the like.

In the present invention, the raw material mainly consisting of the aliphatic polyester can be extruded in molten state to produce tying tape-like materials. The tying tape-like materials include a band for packing heavy materials, a flat tape and a ribbed tape for binding packages and use in an automatic tying machine. They can be manufactured as follows.

(1) The Production of a Polyester Tying Band

The polyester band of the present invention can be produced by extruding the high molecular weight, high crystallinity aliphatic polyester in an molten state, cooled in water, stretched with heating, followed by pressing it by a pair of embossing roll to make a band.

The melting temperature is 170° to 240° C., preferably 180° to 190° C. At less than 170° C., the tape-like product is easily cut during melt extrusion through a die orifice. At more than 240° C., the tape swings greatly and is thus easily cut. Although stretching may be made by using any one of a wet stretching bath, an oven, a heated roll and the like, the stretching temperature is 50° to 100° C., preferably 70° to 90° C. At less than 50° C., the material cannot be easily stretched. At more than 100° C., the tape is easily cut during stretching. Although embossing by embossing rolls is generally performed to prevent slitting or for annealing, embossing need not be performed according to circumstances. On embossing, irregularities may be formed either on one side or both sides of the tape.

(2) The Production of a Polyester Tying Flat Tape

The flat tape of the present invention can be made by extruding the high molecular weight, high crystallinity aliphatic polyester in a melted state using a conventional circular die, T-die and the like.

The extrusion temperature generally is 170° C. to 230° C., and preferably 180° to 210° C. Temperatures of more than 230° C. bring about gelation, which causes non-orientation and fish-eyes. The raw material can be subjected to melt extrusion in the form of a film, or may be directly extruded in the form of a tube using circular dies. After cooling to set, the film is slit into ribbons, oriened and subjected to relaxation with heat. Multilayer tying tapes can also be prepared by melt extrusion, in which the polyester and other resins laminated in multilayers such as two or three layers are extruded in order to supplement the physical properties of the tying tapes. Further, tying tapes with ribs may be prepared in which the die-lip is in a ribbed form. Orientation methods include wet methods and dried methods, in which a steam-heated roll and oven-heated plate are usually applied to tapes at high temperatures, with entire orientation of 3 to 9 times, preferably 4 to 8. The orientation methods can be performed in two steps as well as one.

The orientation temperatures are 40° to 130° C. preferably 60° to 100° C. In the first step, orientation is performed in the range of 30% to 90% relative to the entire magnification of orientation, and preferably 60% to 85%. In the second step, the orientation is preformed at 80° to 120° C., and preferably 90° to 100° C. t achieve orientation.

The orientation is performed in the range of 70% to 10%, preferably 40% to 15%, relative to the entire magnification of orientation.

Although the orientation can be performed even at 40° C. or lower, the resulting tying tape is easily broken because of decreased capacity to resist fraying.

Temperatures of more than 100° C. makes the tying tape have uneven orientation. Further, the relaxation with heat may be performed at 90° to 140° C., and preferably 110° to 150° C. Preferred relaxation rates are 5% to 30%, and particularly 10% to 20%. When thermal relaxation temperatures is 90° C. or less, or relaxation rates is 5% or less, shrinkage of the tying tapes with time duration increases. On the contrary, temperatures of 140° C. or more, with relaxation rates of 30% or more give the tapes wavy shape, with poor appearance in the rolled form.

(3) The Production of Tying Ribbed Tape

The ribbed tape of the present invention can be made by extruding the high molecular weight, high crystallinity aliphatic polyester though a ribbed die using an inflation or T-die method, and the like to form film, followed by slitting and stretching with a hot plate, oven or hot rolls.

The extrusion temperature is 120° to 260° C., preferably 130° to 240° C. At less than 120° C. the film surface becomes rough, and at more than 260° C. the film swings greatly, and thus stable molding cannot be performed.

The stretching temperature is 30° to 160° C. preferably 40° to 150° C.

The stretch ratio is 3 to 7 times. The shape of ribs may be any one of a U-shape, a rectangle, a triangle and the like, and the height, width and interval of the ribs are appropriately determined.

The aliphatic polyester used in the present invention has a number-average molecular weight of at least 10,000, preferably at least 20,000, and contains very small amounts of bond formed by a coupling agent. If the aliphatic polyester exhibits a melting point of 70° to 190° C. and crystallinity, a tying tape-like materials having good mechanical properties can be manufactured which can be used as a tying band or tape for packing or agricultural use.

EXAMPLES

The present invention will be illustrated with reference to the following Examples and Comparative Examples but the invention is not intended to be limited only thereto.

EXAMPLE 1

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 192°–210° C., and after ceasing nitrogen charge, for further 3.5 hr under reduced pressures of 20-2 mmHg. A sample collected had an acid value of 9.2 mg/g, a number-average molecular weight (Mn) of 5,160 and a weight average molecular weight (Mw) of 10,670. Subsequently, 34 g of tetraisopropoxy titanium, a catalyst, was added at normal pressures under nitrogen stream. The temperature was elevated to carry out a deglycol-reaction at temperatures of 215°–220° C. under reduced pressures of 15–0.2 mmhg for 5.5 hr. A sample collected had a number-average molecular weight (Mn) of 16,800 and a weight average molecular weight (Mw) of 43,600. The yield of resulting polyester prepolymer (A1) was 339 kg except condensate water.

5.42 kg of hexamethylene diisocyanate was added to the reactor containing 339 kg of the polyester prepolymer (A1) to perform a coupling reaction for 1 hr at 180°–200° C. The viscosity was rapidly increased, but no gelation occurred. Then, 1.70 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B1) obtained after drying in a vacuum at 90° C. for 6 hr had a yield of 300 kg.

The obtained polyester (B1) was a slightly ivorylike white, waxy crystal, and had a melting point of 110° C., a number-average molecular weight (Mn) of 35,500 a weight-average molecular weight (Mw) of 170,000, a MFR (190° C.) of 1.0 g/10 min, a viscosity of 230 poises in a 10% orthochlorophenol solution and a melt viscosity of $1.5 \times 10^4$ poises at a temperature of 190° C. at a shear rate of 100 sec$^{-1}$. The average molecular weight was measured by a Shodex GPC System-11 (Showa Denko, gel permeation chromatography) using a HFIPA solution containing 5 mmol CF$_3$COONa (concentration of 0.1% by weight) as a medium. A calibration curve was drawn using a PMMA standard sample (Shodex Standard M-75, Showa Denko).

The polyester (B1) was melted and extruded through the 1.4 mm × 16 mm die orifice of a 55-mmφ extruder at a molding temperature of 230° C., cooled in a water bath at room temperature and was then stretched by 6 times through a heating bath at 80° C. The thus-stretched product was then pressed under heating by a pair of embossing rolls (with diamond irregularities on one side) to obtain a packing band.

The thus-obtained band was 6 mm wide and 0.3 mm thick. The adhesion, splitting resistance, unpacking property, and bonded portion strength of each of the examples were examined. The results are shown in Table 1.

When the packing band obtained was buried in the ground for five months, the tensile strength of the band was changed by degradation to a level which did not allow the practical use of the band.

EXAMPLE 2

A tying band was produced from the polyester (B1) obtained by the Example 1 according to the procedures as in Example 1 except that a molding temperature was 170° C.

The thus-obtained band was 6 mm wide and 0.3 mm thick. The adhesion, splitting resistance, unpacking property, and bonded portion strength of each of the examples were examined. The results are shown in Table 1.

EXAMPLE 3

A tying band was produced from the polyester (B1) obtained by the Example 1 according to the procedures as in Example 1 except that a molding temperature was 230° C.

The thus-obtained band was 6 mm wide and 0.3 mm thick. The adhesion, splitting resistance, unpacking property, and bonded portion strength of each of the examples were examined. The results are shown in Table 1.

When the packing band obtained was buried in the ground for five months, the tensile strength of the band was changed by degradation to a level which did not allow the practical use of the band.

EXAMPLE 4

A 700 L reactor was purged with nitrogen, then 177 kg of 1,4-butanediol, 198 kg of succinic acid and 25 kg of adipic acid were charged in it. After the temperature was elevated under nitrogen stream, esterification by dehydration condensation was performed for 3.5 hr at 190°–210° C., and after ceasing nitrogen charge, for further 3.5 hr under reduced pressures of 20–2 mmhg. A sample collected had an acid value of 9.6 mg/g, a number-average molecular weight (Mn) of 6,100 and weight-average molecular weight (Mw) of 12,200. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmHg for 6.5 hr. A sample collected had a number-average molecular weight (Mn) of 17,300 and a weight-average molecular weight (Mw) of 46,400. The resulting polyester (A2) had a yield of 337 kg except condensate water.

4.66 kg of hexamethylene diisocyanate was added to the reactor containing 337 kg of polyester (A2) to perform a coupling reaction for 1 hr at 180°–190° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water by an extruder, and cut by a cutter into pellets. The aliphatic polyester (B2) obtained after drying in a vacuum at 90° C. for 6 hr had a yield of 300 kg.

The obtained polyester (B2) was a slightly ivory-like white, waxy crystal, and had a melting point of 103° C., a number-average molecular weight (Mn) of 36,000, a weight-average molecular weight (Mw) of 200,900, a MFR (190° C.) of 0.52 g/10 min, a viscosity of 680 poises in a 10% orthochlorophenol solution and a melt viscosity of $2.2 \times 10^4$ poises at a temperature of 190° C. at a shear rate of 100 sec$^{-1}$.

A tying band was produced from the polyester (B2) according to the procedures as in Example 1.

The thus-obtained band was 6 mm wide and 0.3 mm thick. The adhesion, splitting resistance, unpacking property, and bonded portion strength of each of the examples were examined. The results are shown in Table 1.

When the packing band obtained was buried in the ground for five months, the tensile strength of the band was changed by degradation to a level which did not allow the practical use of the band.

EXAMPLE 5

The polyester (B2) obtained by the Example 4 was melted and extruded through the 1.4 mm × 16 mm die orifice of a 55-mm$\phi$ extruder at a molding temperature of 170° C., cooled in a water bath at room temperature and was then stretched by 6 times through a heating bath at 80° C. The thus-stretched product was then pressed under heating by a pair of embossing rolls (with diamond irregularities on one side) to obtain a packing band.

The thus-obtained band was 6 mm wide and 0.3 mm thick. The adhesion, splitting resistance, unpacking property, and bonded portion strength of each of the examples were examined. The results are shown in Table 1.

When the packing band obtained was buried in the ground for five months, the tensile strength of the band was changed by degradation to a level which did not allow the practical use of the band.

EXAMPLE 6

A tying band was produced from the polyester (B2) obtained by the Example 4 according to the procedures as in Example 1 except that a heating bath temperature was 90° C.

The thus-obtained band was 6 mm wide and 0.3 mm thick. The adhesion, splitting resistance, unpacking property, and bonded portion strength of each of the examples were examined. The results are shown in Table 1.

When the packing band obtained was buried in the ground for five months, the tensile strength of the band was changed by degradation to a level which did not allow the practical use of the band.

EXAMPLE 7

A 700 L reactor was purged with nitrogen, then 145 kg of ethylene glycol, 251 kg of succinic acid and 4.1 kg of citric acid were charged in it. After the temperature was elevated under nitrogen stream, esterification by dehydration condensation was performed for 3.5 hr at 190°–210° C., and after ceasing nitrogen charge, for further 5.5 hr under reduced pressures of 20–2 mmhg. A sample collected had an acid value of 8.8 mg/g, a number-average molecular weight (Mn) of 6,800 and a weight-average molecular weight (Mw) of 13,500. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmHg for 4.5 hr. A sample collected had a number-average molecular weight (Mn) of 33,400 and a weight-average molecular weight (Mw) of 137,000. The resulting polyester (A3) had a yield of 323 kg except condensate water.

3.23 kg of hexamethylene diisocyanate was added to the reactor containing 323 kg of polyester (A3) to perform a coupling reaction for 1 hr at 180°–190° C. The viscosity was rapidly increased, but no gelation occurred. Then, 1.62 kg of Irganox 1010 (Ciba-Geigy) as an antioxidant and 1.62 kg of calcium stearate as a lubricant were added, and the mixture was further stirred for 30 min. The resulting reaction product was extruded into water by an extruder, and cut by a cutter into pellets. The polyester (B3) obtained after drying in a vacuum at 90° C. for 6 hr had a yield of 300 kg.

The obtained polyester (B3) was a slightly ivory-like white, waxy crystal, and had a melting point of 96° C., a number-average molecular weight (Mn) of 54,000, a weight-average molecular weight (Mw) of 324,000, a MFR (190° C.) of 1.1 g/10 min, a viscosity of 96 poises in a 10% orthochlorophenol solution and a melt viscosity of $1.6 \times 10^4$ poises at a temperature of 190° C. at a shear rate of 100 sec$^{-1}$.

A tying band was produced from the polyester (B3) according to the procedures as in Example 1.

The thus-obtained band was 6 mm wide and 0.3 mm thick. The adhesion, splitting resistance, unpacking property, and bonded portion strength of each of the examples were examined. The results are shown in Table 1.

EXAMPLE 8

A 700 L reactor was purged with nitrogen, then 200 kg of 1,4-butanediol, 250 kg of succinic acid and 2.8 kg of trimethylol propane were charged in it. After the temperature was elevated under nitrogen stream, esterification by dehydration condensation was performed for 4.5 hr at 192°–220° C., and after ceasing nitrogen charge, for further 5.5 hr under reduced pressures of 20–2 mmhg. A sample collected had an acid value of 10.4 mg/g, a number-average molecular weight (Mn) of 4,900 and a weight-average molecular weight (Mw) of 10,000. Subsequently, 37 g of tetraisopropoxy titanium, a catalyst, was added at normal pressures under nitrogen stream. The temperature was elevated to perform a deglycol-reaction at temperatures of 210°–220° C. under reduced pressures of 15–1.0 mmHg for 8 hr. A sample collected had a number-average molecular weight (Mn) of 16,900 and a weight-average molecular weight (Mw) of 90,300. The resulting polyester (A4) had a yield of 367 kg except condensate water of 76 kg.

3.67 kg of hexamethylene diisocyanate was added to the reactor containing 367 kg of polyester (A4) to perform a coupling reaction for 1 hr at 160°–200° C. The viscosity was rapidly increased, but no gelation occurred. Then, 367 g of Irganox 1010 (Ciba-Geigy) as an antioxidant and 367 g of calcium stearate as a lubricant were added, and the mixture was further stirred for 30 min. The resulting reaction product was extruded into water by an extruder, and cut by a cutter into pellets. The polyester (B4) obtained after drying in a vacuum at 90° C. for 6 hr had a yield of 350 kg.

The obtained polyester (B4) was a slightly ivorylike white, waxy crystal, and had a melting point of 110° C., a number-average molecular weight (Mn) of 17,900 a weight-average molecular weight (Mw) of 161,500 (Mw/Mn=9.0), a MFR (190° C.) of 0.21 g/10 min and a melt viscosity of 2.0 x $10^4$ poises at a temperature of 180° C. at a shear rate of 100 sec$^{-1}$. The average molecular weight was measured in the same manner as in Example 1.

A tying band was produced from the polyester (B4) according to the procedures as in Example 2 except that molding temperature was 230° C.

The thus-obtained band was 6 mm wide and 0.3 mm thick. The adhesion, splitting resistance, unpacking property, and bonded portion strength of each of the examples were examined. The results are shown in Table 1.

When the packing band obtained was buried in the ground for five months, the tensile strength of the band was changed by degradation to a level which did not allow the practical use of the band.

COMPARATIVE EXAMPLE 1

The polyester (A1) was melted, extruded and stretched under the same conditions as those in Example 1, the polyester was broken in the course of stretching by about 2 times, and thus the intended band could not be obtained.

When the melted and extruded polyester A1 was buried in the ground for 5 months, the polyester assumed the same state as that of Example 1.

EXAMPLE 9

After being dried using a dew point-adjusting type of hot air-circulating drier at 120° C. for 3 hours, the polyester (B1) obtained by the Example 1 was subjected to melt extrusion with an extruder having a diameter of 90 mm$\phi$ using a T-type die extrusion unit having a die width of 1,200 m/m and a lip gap of 0.7 m/m; and then cooled by a water-chilled roll to prepare base sheet. This base sheet was slit into 20 m/m widths to perform the hot plate orientation and thermal relaxation. A tying flat tape of 10 m/m width and 12,000 deniers was prepared at an orientation magnification of 4.5, a temperature of 90° C., a relaxation temperature of 120° C., a relaxation rate of 10%, and an orientation rate of 80 re/min.

Tensile strength, one of the physical properties of the resulting tying tape was 4.3 g/d, being sufficient enough for practical use.

The preparation conditions in the Examples and Comparative Examples, results of evaluation for appearance and physical properties of the resultant tying flat tapes are shown in Table 2. Physical properties and the like were measured in accordance with JIS Z1533.

Buried in the earth for 5 months, the tying flat tapes decomposed to strengths that could not withstand use.

EXAMPLE 10 AND 11

Tying flat tapes were prepared under the same conditions as under those in Example 9 except that the yarn width and denier were changed. The physical properties of the resultant tying flat tapes are shown in Table 2.

Further, the results of burying these tying flat tapes in the earth for 5 months, were the same as those in Example 9.

EXAMPLE 12

Polyester (B2) obtained by the Example 4 was subjected to extrusion molding for a base sheet and to orientation and relaxation under the same conditions as those in Example 9 to prepare a tying flat tape with a 10 m/m width and 12,000 deniers, showing an extremely-strong tensile strength of 4.5 g/d. The physical properties of the resultant tying flat tape are shown in Table 2.

Buried in the earth for 5 months, the tying flat tapes decomposed to strengths that could not withstand use.

EXAMPLES 13 AND 14

A tying flat tape was prepared under the same conditions as those in Example 9 except that the denier was changed.

Further, buried in the earth for 5 months, the tying flat tape was decomposed to become unusable.

EXAMPLE 15

Polyester (B3) obtained by the Example 7 was treated under the same conditions as under those in Example 9 to prepare a tying flat tape. The resultant tying tape had a tensile strength of 4.8 g/d, showing extreme strength.

Buried in the earth for 5 months, the tying flat tapes decomposed to strengths that could not withstand practical use.

EXAMPLE 16

After being dried using a dew point-adjusting type of hot air-circulating drier at 120° C. for 3 hours, the polyester (B4) obtained by the Example 8 was subjected to melt extrusion with an extruder having a diameter of 90 mm$\phi$ using a T-type die extrusion unit having a die width of 1,200 m/m and a lip gap of 0.7 m/m; and then cooled by a water-chilled roll to prepare base sheet. This base sheet was slit into 20 m/m widths to perform the hot plate orientation and thermal relaxation. A tying flat tape of 10 m/m width and 12,000 deniers was prepared at an orientation magnification of 4.5, a temperature of 90° C., a relaxation temperature of 120° C., a relaxation rate of 10%, and an orientation rate of 80 m/min.

Tensile strength, one of the physical properties of the resulting tying flat tape was 4.0 g/d, being sufficient enough for practical use.

COMPARATIVE EXAMPLE 2

The extrusion temperature in Example 9 was changed to 180° C. in Comparative Example 2. The rapid elevation of current in the motor was observed and surface roughening and surging of the base sheet was seen soon later. Although the base sheet was slit and then oriented, but this was stopped because of frequent orientation breaks.

COMPARATIVE EXAMPLE 3

The entire magnification of orientation was changed to 3 times that in Example 9. Although non-orientated portions occurred, orientation was possible. However, the rolled appearance of the tape rarely showed many weave.

COMPARATIVE EXAMPLE 4

Although the polyester (A1) was molded under the same preparation conditions as in Example 9, orientation breaks occurred too frequently during orientation to obtain the desired tying tape.

COMPARATIVE EXAMPLE 5

The polyester (A2) which was prepared in Example 4 was used.

Although the polyester (A2) was molded under the same preparation conditions as under those in Example 9, orientation breaks occurred too frequently during orientation by 4 times magnification to obtain the desired tying tape.

COMPARATIVE EXAMPLE 6

The polyester (A3) which was prepared in Example 7 was used.

Although the polyester (A3) was molded under the same preparation conditions as under those in Example 9, orientation breaks occurred too frequently during orientation by 4 times magnification to obtain the desired tying tape.

COMPARATIVE EXAMPLE 7

A polyester was used to perform orientation under the same conditions as in Example 9 except that the orientation was done only in a bath at an entire magnification of 4.5 and at a temperature of 70° C. decreased by 20° C. The necking point was moved backward from the water bath to cause orientation unevenness of the yarn, with a tensile strength of 2.8 g/d.

EXAMPLE 17

The polyester (B1) obtained by Example 1 was extruded through a ribbed circular die at a molding temperature of 190° C. to form a film. The thus-formed film was slit into widths of 200 mm and stretched by 5 times by a hot plate extender at 70° C. to produce a ribbed tape of 15,000 denier. The shape of the ribs was a U-shape, and had a depth of 0.8 mm, a lip gap of 0.8 mm and a rib interval of 2.5 mm.

The ribbed tape obtained had a tensile strength of 4.6 g/d, bulkness and an excellent soft feel.

When the ribbed tape was buried in the ground for 5 months, the strength degraded to a level which did not allow practical use of the tape.

EXAMPLE 18

A ribbed tape was produced under the same conditions as employed in Example 17 with the exception that the polyester (B1) obtained by Example 1 was stretched at 80° C.

The ribbed tape obtained had a tensile strength of 4.2 g/d, bulkness and an excellent soft feel.

When the ribbed tape was buried in the ground for 5 months, the strength degraded to a level which did not allow practical use of the tape.

EXAMPLE 19

A ribbed tape was produced under the same conditions as employed in Example 17 with the exception that the polyester (B1) obtained by Example 1 was molded into a film at 220° C.

The ribbed tape obtained had a tensile strength of 4.4 g/d, bulkness and an excellent soft feel.

When the ribbed tape was buried in the ground for 5 months, the strength degraded to a level which did not allow practical use of the tape.

EXAMPLE 20

A ribbed tape was produced under the same conditions as employed in Example 17 with the exception that the polyester (B2) obtained by Example 4 was molded into a film at 190° C. and stretched at 65° C.

The ribbed tape obtained had a tensile strength of 5.0 g/d, bulkness and an excellent soft feel.

When the ribbed tape was buried in the ground for 5 months, the strength degraded to a level which did not allow practical use of the tape.

EXAMPLE 21

A ribbed tape was produced from the polyester (B3) obtained by Example 7 under the same conditions as employed in Example 20.

The ribbed tape obtained had a tensile strength of 5.4 g/d, bulkness and an excellent soft feel.

When the ribbed tape was buried in the ground for 5 months, the strength degraded to a level as in Example 18.

EXAMPLE 22

The polyester (B4) obtained by Example 8 was extruded through a ribbed circular die at a molding temperature of 190° C. to form a film. The thus-formed film was slit into widths of 200 mm and stretched by 5 times by a hot plate extender at 70° C. to produce a ribbed tape of 15,000 denier. The shape of the ribs was a U-shape, and had a depth of 0.8 mm, a lip gap of 0.8 mm and a rib interval of 2.5 mm.

The ribbed tape obtained had a tensile strength of 3.2 g/d, bulkness and an excellent soft feel.

When the ribbed tape was buried in the ground for 5 months, the strength degraded to a level which did not allow practical use of the tape.

COMPARATIVE EXAMPLE 8

The polyester (A1) obtained by Example 1 was extruded through a ribbed circular die at a molding temperature of 200° C. to form a film. However, a film could not be stably produced.

TABLE 1

| | Adhesion | Splitting resistance | Unpacking property | Bond portion strength (kg) |
|---|---|---|---|---|
| Example | | | | |
| 1 | good | good | good | 26 |
| 2 | good | good | good | 21 |
| 3 | good | good | good | 24 |
| 4 | good | good | fairly good | 28 |
| 5 | good | good | good | 31 |
| 6 | fairly good | good | good | 25 |
| 7 | fairly good | good | good | 22 |
| 8 | fairly good | good | good | 18 |
| Comparative Example | | | | |
| 1 | No good band formed | | | |

TABLE 2

| | Aliphatic polyesters | Die temp (°C.) | Orientation magnification (times) | Orientation temperature (°C.) |
|---|---|---|---|---|
| Example | | | | |
| 9 | B1 | 210 | 4.5 | 90 |
| 10 | B1 | 210 | 4.5 | 90 |
| 11 | B1 | 210 | 4.5 | 90 |
| 12 | B2 | 210 | 4.5 | 90 |
| 13 | B2 | 210 | 4.5 | 90 |
| 14 | B2 | 210 | 4.5 | 90 |
| 15 | B3 | 210 | 4.5 | 90 |
| 16 | B4 | 210 | 4.5 | 90 |
| Comparative Example | | | | |
| 2 | B1 | 180 | 4.5 | 90 |
| 3 | B1 | 210 | 3.0 | 90 |
| 4 | A1 | 210 | 4.5 | 90 |
| 5 | A2 | 210 | 4.0 | 90 |
| 6 | A3 | 210 | 4.0 | 90 |
| 7 | B1 | 210 | 4.5 | 70 |

TABLE 2-continued

| | Thermal treatment (%) | (°C.) | Denier | Binder tensile strength (g/d) | Evaluation appearance |
|---|---|---|---|---|---|
| Example | | | | | |
| 9 | 10 | 120 | 12000 | 4.3 | good |
| 10 | 10 | 120 | 14000 | 4.1 | good |
| 11 | 10 | 120 | 16000 | 3.9 | good |
| 12 | 10 | 120 | 12000 | 4.5 | good |
| 13 | 10 | 120 | 14000 | 4.3 | good |
| 14 | 10 | 120 | 16000 | 4.1 | good |
| 15 | 10 | 120 | 12000 | 4.8 | good |
| 16 | 10 | 120 | 10000 | 4.0 | good |
| Comparative Example | | | | | |
| 2 | 10 | 120 | 12000 | — | incabaple orientation |
| 3 | 10 | 120 | 12000 | — | frequent non-orientations |
| 4 | 10 | 120 | — | — | frequent orientation breaks |
| 5 | 10 | 120 | — | — | frequent orientation breaks |
| 6 | 10 | 120 | — | — | frequent orientation breaks |
| 7 | 10 | 120 | 12000 | 2.8 | frequent uneven orientation |

What is claimed is:

1. Tying tape-like material formed by extrusion molding, comprising as a main component an aliphatic polyester having a melt viscosity of $1.0 \times 10^3$–$4.0 \times 10^4$ poises at a temperature of 190° C. and a shear rate of 100 sec$^{-1}$, and having a melting point of 70°–190° C.

2. The tying tape-like material as claimed in claim 1 wherein the aliphatic polyester has a number-average molecular weight of at least 10,000 and contains 0.03–3.0% by weight of urethane bonds.

3. The tying tape-like material as claimed in claim 1 wherein the aliphatic polyester has a number-average molecular weight of at least 10,000 and contains 0.05–2.0% by weight of urethane bonds.

4. The tying tape-like material as claimed in claim 1 wherein the aliphatic polyester has a number-average molecular weight of at least 10,000 and contains 0.1–5.0% by weight of urethane bonds.

5. The tying tape-like material as claimed in any one of claims 1 to 4 comprising an aliphatic polyester obtained by reacting 0.1–5 parts by weight of diisocyanate with 100 parts by weight of an aliphatic polyester prepolymer having a number-average molecular weight of at least 5,000 and a melting point of at least 60° C.

6. The tying tape-like material as claimed in any one of claims 1 to 4 wherein the tying tape-like material is a band.

7. The tying tape-like material as claimed in any one of claims 1 to 4 wherein the tying tape-like material is a flat tape.

8. The tying tape-like material as claimed in any one of claims 1 to 4 wherein the tying tape-like material is a ribbed tape.

9. The tying tape-like material as claimed in claim 2 wherein the aliphatic polyester has a repeated chain structure in which a polyester prepolymer having a number-average molecular weight (Mn) of 5,000 or more and comprising an aliphatic glycol and aliphatic dicarboxylic acid, is combined through the urethane bonds.

10. The tying tape-like material as claimed in claim 2 wherein the aliphatic polyester has a repeated chain structure in which a polyester prepolymer having a number-average molecular weight (Mn) of 5,000 or more and obtained by reacting an aliphatic glycol, aliphatic dicarboxylic acid and, as the third component, at least one polyfunctional component selected from the group consisting of trifunctional or tetrafunctional polyols, oxycarboxylic acids and polybasic carboxylic acids or acid anhydrides thereof, is combined through the urethane bonds.

11. The tying tape-like material as claimed in claims 9 or 10 wherein the polyester prepolymer has a unit selected from the group consisting of ethylene glycol, 1,4-butanediol, 1,6-hexanediol, decamethylene glycol, neopentyl glycol and 1,4-cyclohexane dimethanol as a glycol unit, and has a unit selected from the group consisting of succinic acid, adipic acid, suberic acid, sebasic acid, dodecanoic acid, succinic anhydride and adipic anhydride as a dicarboxylic acid unit.

12. The tying tape-like material as claimed in claim 10 wherein the polyester prepolymer contains one or more compounds selected from the group consisting of trimethylol propane, glycerin and pentaerythritol as the trifunctional or tetrafunctional polyol of the third component.

13. The tying tape-like material as claimed in claim 10 wherein the polyester prepolymer contains one or more compounds selected from the group consisting of malic acid, citric acid and tartaric acid as the trifunctional or tetrafunctional oxycarboxylic acid of the third component.

14. The tying tape-like material as claimed in claim 10 wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid of the third component.

* * * * *